Aug. 15, 1961

J. A. McCANN ET AL 2,996,662

MAGNETIC DENSITOMETER

Filed July 1, 1959

INVENTORS.
ROBERT H. JONES
JOSEPH A. McCANN
BY

Roland A. Anderson

ATTORNEY.

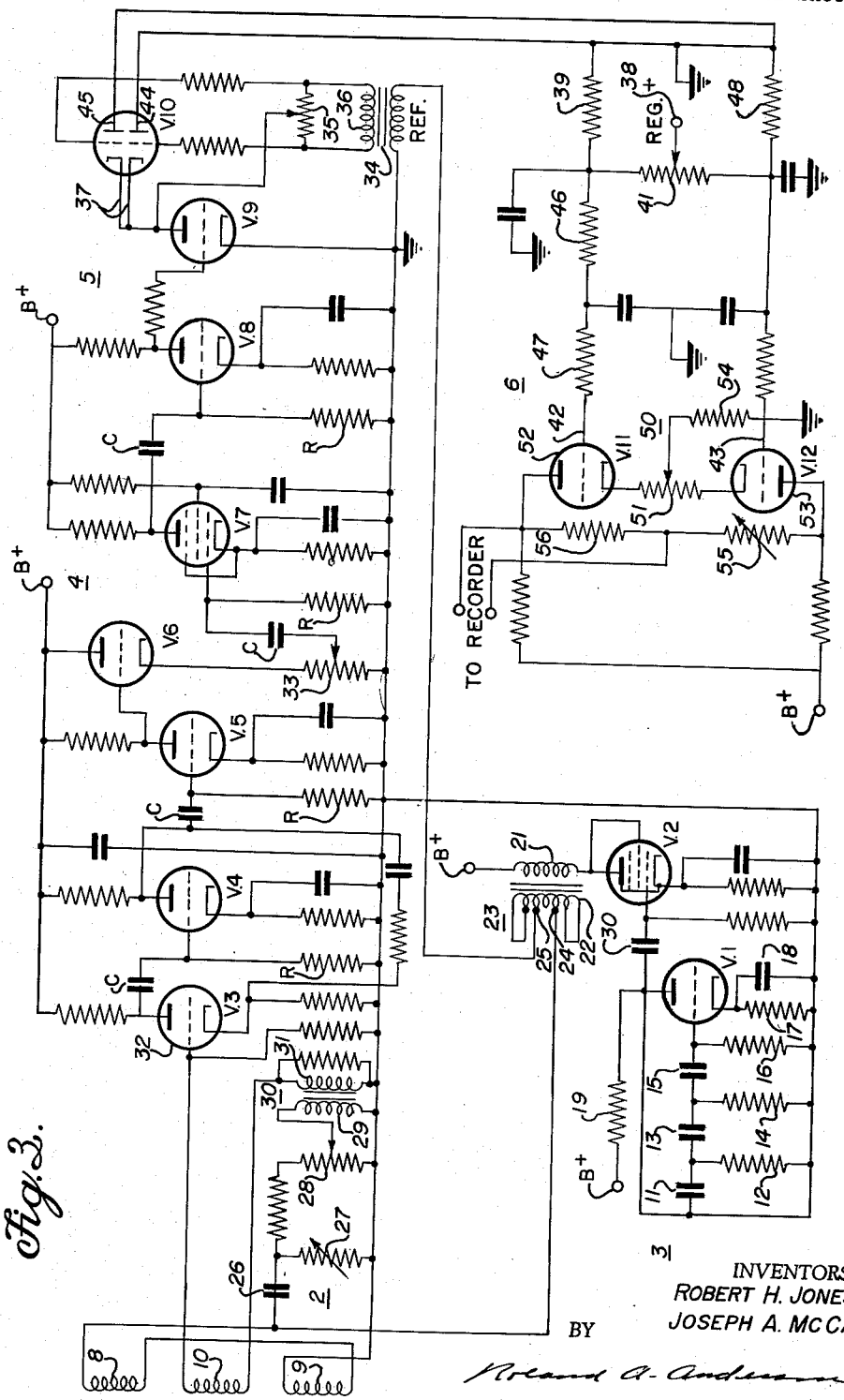

United States Patent Office 2,996,662
Patented Aug. 15, 1961

2,996,662
MAGNETIC DENSITOMETER
Joseph A. McCann and Robert H. Jones, Scotia, N.Y., assignors to the United States of America as represented by the United States Atomic Energy Commission
Filed July 1, 1959, Ser. No. 824,443
5 Claims. (Cl. 324—37)

This invention relates to the field of non-destructive testing of materials and especially to a novel method and apparatus for detecting flaws and inconsistencies in a material.

In general, it has been the practice of the prior art to subject a material to a magnetic field and in some manner to measure any variation in the uniformity of the magnetic field pattern and thereby indicate changes in uniformity of the material. In several of the previous devices the material has been subjected to an alternating magnetic field whereby a voltage may be induced in a secondary coil as an indication of the characteristics exhibited by the material under test.

In particular, one form of such a system has consisted of passing the material through a coil which also forms one element of a tuned circuit in an oscillator. In this manner, the oscillator frequency was altered by any change in the characteristic of the material. In another arrangement a number of coils positioned adjacent the material have been used to control the operating point of an oscillator and the A.C. output of the oscillator has been rectified to produce an indication of the material characteristic.

In the aforementioned arrangements the principal aim of the system was to give a sensitive, instantaneous indication of a change in the characteristic of the material under analysis. Although these systems possess adequate sensitivity for some applications, it was found necessary to design a system exhibiting even greater sensitivity and uniform reproduction of a change in the characteristic of a material due to the small size and diversity of materials requiring analysis.

Another factor in developing a system for analyzing materials in a non-destructive manner is the need for substantial output from the system to operate recorders or indicating devices. The prior art has found it necessary to employ complicated electromagnets for operating recorders or to utilize elaborate amplifying equipment to provide the necessary signal for operating a recorder or indicating device. Consequently, the need for a simplified, high level output, non-destructive testing system was present and has resulted in the invention hereinafter described.

It is, therefore, an object of the present invention to provide a sensitive and reliable system for locating changes in characteristics of a material.

It is another object of the invention to provide a system incorporating a minimum number of components while, at the same time, furnishing sufficient output for operating recorders and indicating devices.

In brief, the system of the present invention in its preferred form includes two primary coils connected in series opposition and adapted to be placed in an inductive relation to the material under test. A source of constant frequency alternating current is coupled across the primary coil combination to provide an alternating magnetic field within the material. A pick-up coil is disposed in symmetrical inductive relationship with the primary coils. Along with the signal induced in the pick-up coil a second signal is coupled to the pick-up coil through a phase shifter from the constant frequency source. The combination of these two signals creates a distorted signal exhibiting harmonic frequency components. By selecting a particular harmonic of the distorted signal in an especially designed amplifier, a signal indicative of an inconsistency in the material is produced. This last mentioned signal is compared with a reference signal, preferably the output of the constant frequency source, to give an instantaneous detection of the change in material characteristic.

The invention will be best understood by a description in connection with the drawings, wherein:

FIGURE 3 illustrates a complete system incorporating the arrangement of FIGURE 1, specifically showing the detailed circuit elements of a preferred form of the invention.

Figure 1:
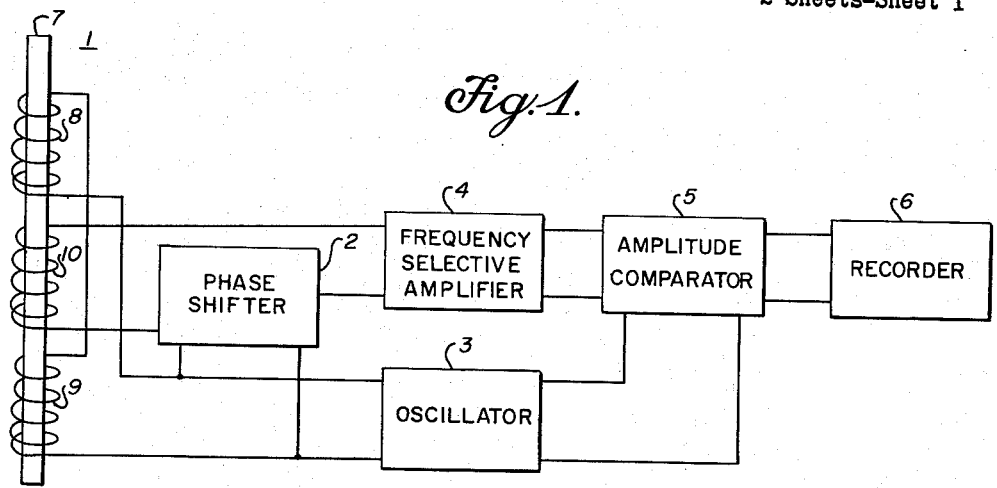
FIGURE 1 is a simplified block diagram of the main elements of the system in accordance with a preferred form of the present invention.

Referring to FIGURE 1, the system in its simplified form comprises a detecting coil assembly 1, a phase shifter 2, an oscilaltor 3, an amplifier 4, an amplitude comparator 5, and a recorder 6. The material under test 7 is brought in inductive relationship to the detecting coil assembly 1. In the normal situation the material 7 is moved past the detecting coil assembly 1 at a uniform rate for identification of changes in characteristic of the material 7. The coils 8 and 9 of the detecting coil assembly 1 constitute the primary coils and are connected in series opposition. The primary coils are preferably identical in the number of turns and spacing of the turns for the reasons more fully set forth below. The pick-up coil 10 is positioned midway between the primary coils in such a manner that it is in symmetrical inductive relationship to the primary coils 8 and 9. The oscillator 3 is coupled across the series combination of the primary coils 8 and 9 to provide the energizing alternating current, constant frequency signal. With nothing more, it is evident that because of the arrangement of the primary coils 8 and 9 and pick-up coil 10 a material of uniform characteristic placed in inductive relation with the detecting coil assembly 1 will not produce a signal in the pick-up coil 10, because of the identical nature and relationship of the pick-up coil 10 with respect to the primary coils 8 and 9. However, when an inconsistency appears in the material 7 the balanced relationship will be altered and a signal will be produced in the pick-up coil 10 indicative of this change in characteristic. On a practical basis, it is very difficult to maintain a balanced relationship between the pick-up coil 10 and the primary coils 8 and 9 and some signal is usually present in the pick-up coil 10 from the energizing oscillator 3.

To facilitate identification of a signal in the pick-up coil 10 produced by a change in a characteristic of material 7 a second signal is introduced and combined with the pick-up signal. This second signal is obtained from the oscillator 3 and coupled through a phase shifter 2 for combination with the pick-up signal. As a result of the combination of these two signals a third signal is produced having a distorted form which is characterized by the presence of harmonic frequency components of the exciting frequency. In the present case, the signal in pick-up coil 10, having a frequency of the oscillator 3, is combined with a signal of the same frequency but different phase relationship. The combination of these two signals results in the production of harmonics of the oscillator frequency, and the third harmonic of the oscillator frequency is significantly emphasized. The harmonic signal resulting from the combination of the pick-up signal and the phase shifting signal is directly indicative of the presence of a change in the characteristic of the material and is processed by the following system components to provide an indication of the change in characteristic.

The next essential system function is the amplification of the harmonic component indicative of the change in material characteristic. To accomplish this function an amplifier 4 selective to the harmonic frequency receives the distorted signal at its input and amplifies the particular harmonic while discriminating against other frequencies. The high selectivity in the amplifier is possible by a unique selection of values in the R-C amplifier stages making up the amplifier, as will be more specifically brought out in connection with the detailed circuit diagram presented in FIGURE 3.

The amplifier output is coupled to an amplitude comparator 5 wherein a comparison of the instantaneous amplitude of the amplified harmonic signal and the amplitude of the oscillator output is made. In this manner, the presence of a change in characteristic is immediately detected by a change in the relative amplitudes of the fundamental and a harmonic component. The output of the amplitude comparator 5 operates a recorder or other indicating means to provide the necessary presentation of the data on the material under test.

Figure 2:
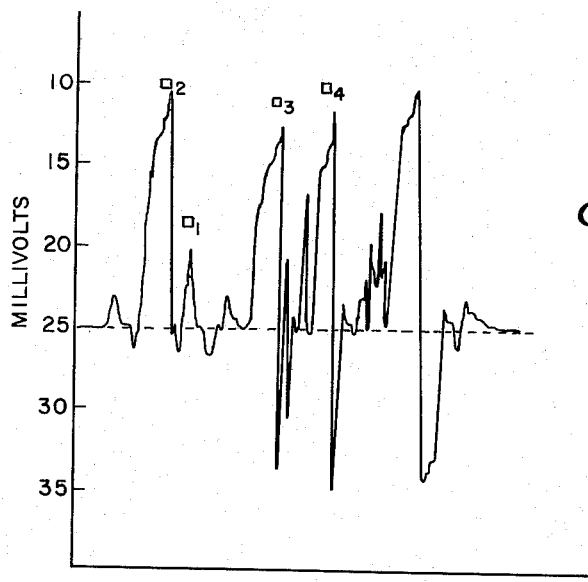
FIGURE 2 shows a tracing obtained from a recorder during the non-destructive testing of a material with a preferred form of the present invention.

With reference to FIGURE 2, a portion of one tracing obtained with the system of the present invention is shown. The material under test consisted of a long piece of Alumel tubing 15 feet long, 3½ to 32½ mils outside diameter and a wall thickness of 3.3 to 2.7 mils. Before a test was conducted with the present invention the material was carefully inspected by other known non-destructive methods and only one external defect, identified as D1, was found. However, the tracing from the present invention shows other defects present in the material, such as D2, D3 and D4. It may be assumed that the minimum deflections on the complete material represent minor granular compositions, but the large amplitude deviations are evidently serious flaws which should be considered. Because of the care necessary in handling this tubing of small diameter only the present test could be used to examine it electronically. X-rays would present a ptciure too small to examine by eye and, therefore, could not be applied in analyzing the material.

The present invention may be also used to detect minute magnetic inclusions in homogeneous material and it is possible to determine the degree that the material is in its classification as homogeneous. As an example, small fragments of cold rolled steel .0003 gram in weight, .0037 inch thick and about .02 inch long have been imbedded in a 3/16 inch tube of polystyrene and moved through the probe at a uniform speed. The recorder tracing clearly showed the flaw and the resolution was of such quality as to give a picture of the physical shape of the flaw.

Referring to FIGURE 3, a preferred circuit arrangement for the present invention comprises the same detecting coil assembly 1 described in connection with FIGure 1. The tubes V1 and V2 constitute the oscillator 3 section, while the tubes V3 through V8 comprise the amplifier 4. Tubes V9 and V10 make up the amplitude comparator 5. The remaining tubes, V11 and V12, comprise a power amplifier for driving the recorder 6. The oscillator 3 is of the phase-shift type with the normal phase shifting capacitance and resistance sections comprising capacitors and resistors 11 and 12, 13 and 14, and 15 and 16 connected between the plate and grid of triode tube V1. The cathode bias resistance 17 and decoupling capacitance 18 are of the conventional type. The plate of the oscillator 3 is coupled to an operating potential through a dropping resistance 19. The oscillator 3 produces an alternating current signal in the low frequency range. A frequency of 1000 cycles was selected for the system presented in this description. For a more complete and thorough description of phase shift oscillators reference is made to the text "Radiation Laboratory Series, Massachusetts Institute of Technology, first edition, volume 19, pages 110-115. The output of oscillator 3 is coupled through capacitor 20 to an A.C. amplifier comprising pentode tube V2 of conventional amplifier design. The output from the A.C. amplifier is coupled through a primary coil 21 in the plate circuit of the pentode tube V2 to the secondary 22 of the transformer 23. The secondary 22 is provided with two taps, 24 and 25 to couple the oscillator output to the detecting coil assembly 1 and to the amplitude comparator 5, respectively.

The output of the oscillator 3 is coupled both to the primary coils 8 and 9 and to a phase shifting network comprising capacitor 26 and variable resistor 27. As is well known, a series combination of a resistance and a reactance can be used for shifting the phase of a sinusoidal waveform. If an alternating voltage is applied across the combination, the voltage across either element differs in phase from that across the other by 90° and differs in phase from the applied voltage by an amount that depends upon the ratio of the reactance to the resistance. Adjustment of resistor 27 permits a control of the phase of the voltage across the resistance from approximately 0 to 90°. The output from the phase shifter 2 can be adjusted by varying the tap on resistor 28, where the primary 29 of transformer 30 is connected across one portion of the resistor 28. A secondary 31 of transformer 30 couples the phase shifted voltage in series with the pick-up coil 10. The series combination of the pick-up coil 10 and transformer secondary 31 is connected across the input to the amplifier 4 constituted by the grid 32 of V3.

The amplifier 4 consists of several resistance coupled amplifier stages of conventional design, except for the incorporation of particular values for the coupling elements to achieve frequency discrimination within the amplifier. More particularly, coupling capacitor C and resistor R are designed to have a time constant equal to $$\frac{1}{2\pi F_3}$$

where F is equal to the third harmonic of the oscillator 3 frequency. Utilizing the time constants offered by R and C, a value is achieved to represent the frequency desired. In this manner, relative sensitivity to the third harmonic is increased without further voltage amplification. Representative values for the R and C at a frequency of 1,000 cycles for oscillator 3 are 100,000 ohms and 500 micromicrofarads. These components when used as coupling capacitors and grid resistors in the amplifier stages result in a very sensitive search frequency. Other values were found to cause a decided drop in sensitivity. Adjustment of the output from the amplifier 4 is obtained by varying the position of the tap on resistance 33 in the cathode of the triode tube V6. Other features of the amplifier are of conventional design and reference is made to the text entitled "Fundamentals of Vacuum Tubes" by Eastman, McGraw-Hill, third edition, pages 264-303, for a more detailed discussion of the amplifier design which does not constitute a part of the present invention.

The output of the amplifier 4 is coupled to an amplitude comparator 5 comprising tubes V9 and V10. The reference voltage from oscillator 3 is coupled through the transformer 34 in a balanced fashion to the grids of twin triode V10. Resistor 35 is connected across the secondary 36 of transformer 34 and has a tap connected to the cathodes 37 of tube V10. Adjustment of the tap permits balancing of the voltage applied to the grid. The amplified output of the particular harmonic is cathode coupled to the tube V10 by triode tube V9 and the output at the plates of tube V10 thereby is proportional to the instantaneous phase and amplitude difference between the harmonic signal and the oscillator reference signal. The voltage applied at terminal 38 through plate resistances 39 and 40 may be varied by adjusting the tap on resistor 41 to balance the output of the tube V10. For a more thorough description of the operation of amplitude comparators similar to the one presented herein, reference is made to the text Radiation Laboratory Series, Massachusetts Institute of Technology, first edition, volume 21, pages 383-386.

The tubes V11 and V12 constitute a push-pull balanced amplifier 50 for the output of tube V10. The grids 42 and 43 are connected to plates 44 and 45, respectively, of tube V10 through several dropping resistances 46 and 47, and 48 and 49, respectively. The tubes V11 and V12 are balanced by adjustment of the tap positioned on resistor 51 connected between the cathodes 52 and 53. The cathode resistor 54 is connected to ground at the end opposite its junction to the tap of resistor 51. The output of balanced amplifier 50 may be adjusted by varying resistor 55 connected in series with the resistor 56 across the plates of the tubes V11 and V12. A recorder or indicating means may be connected between one plate and a junction point of resistors 55 and 56 to give the tracing such as shown in FIGURE 2. For a more particular description of balanced push-pull amplifiers reference is made to the text "Engineering Electronics," McGraw-Hill, 1957, pages 211-212.

We claim:

1. A system for locating defects and metallic inclusions in the materials, comprising two primary coils connected in series opposition and adapted to be placed in inductive relation to the material under test, a source of constant frequency alternating current coupled across the primary coil combination, a pick-up coil disposed in symmetrical inductive relationship with said primary coils, a phase-shifter coupled to the output of the energizing source, the output of the phase-shifter coupled in series with the pick-up coil, an amplifier selective to the third harmonic of the energizing source frequency, means connecting the series combination of the pick-up coil and the phase-shifter output across the input of said amplifier, means coupled to the output of said amplifier and the energizing source for comparing the instantaneous amplitude of the amplifier output and the instantaneous amplitude of the energizing source and producing an output proportional to the difference in amplitudes, means coupled to the output of the amplitude comparison means to give an indication of the amplitude difference, and thereby show the character of a change in the material characteristic.

2. A system for locating defects and metallic inclusions as described in claim 1, wherein the amplifier comprises a number of R-C coupled amplifier stages and the time constants of the coupling resistors and capacitors are equal to
$$\frac{1}{2\pi F_3}$$
where $F_3$ is the third harmonic of the source frequency, to provide maximum comparative attentuation of the fundamental and third harmonic of the source frequency.

3. A system for locating defects and metallic inclusions as described in claim 2, wherein the means coupled to the output of the amplitude comparison means is a recorder, providing a permanent presentation of the character of the changes in characteristics exhibited by the material under test.

4. Apparatus for detecting flaws in articles, means for establishing a magnetic field penetrating the article, means coupled to said magnetic field for generating a first electric signal and responsive to flaws in said article to produce a harmonic flaw signal, means for superimposing on said first electric signal a second signal of corresponding frequency but shifted in phase relative to said first signal to emphasize the harmonic flaw signal in the resultant signal waveform, means selectively amplifying said harmonic of the resultant signal, and means comparing the instantaneous amplitude of said resultant signal and the instantaneous amplitude of a reference source having a frequency corresponding to said first and second signals.

5. Means for detecting flaws in a body, comprising a source of alternating electrical energy, coils connected across said source for generating symmetrical opposed magnetic fields in said body, coil means for disposition in proximity to said magnetic fields for detecting an imbalance therein due to flaws in said body, an amplifier stage receiving the output of said coil means, and arranged to amplify a particular harmonic frequency of said source, a phase shift network interposed between said source and the input to said amplifier stage, the output from said phase shift network being introduced to the input of said amplifier stage in series with the output from said coil means, the output from said amplifier stage including said harmonic especially responsive to distortions in said magnetic fields caused by flaws in said body, and means responsive to the difference in instantaneous amplitude between the amplifier output and the output of said source for indicating the existance of flaws in said body.

References Cited in the file of this patent
UNITED STATES PATENTS

| | | |
|---|---|---|
| 2,007,772 | Sams et al. | July 9, 1935 |
| 2,152,690 | Hana | Apr. 4, 1939 |
| 2,511,564 | Callan | June 13, 1950 |
| 2,844,787 | McCann | July 22, 1958 |